United States Patent Office 2,973,245
Patented Feb. 28, 1961

2,973,245

METHOD OF PREPARING ALUMINA HYDRATE COMPOSITIONS CONTAINING TRIHYDRATE

John W. Teter, deceased, late of Clarendon Hills, Ill., by Ruth Young Teter, administratrix, Clarendon Hills, and John L. Gring, Homewood, Ill., and Carl D. Keith, Summit, N.J., assignors to Sinclair Refining Company, a corporation of Maine No Drawing. Filed Apr. 27, 1956, Ser. No. 581,251

4 Claims. (Cl. 23—143)

The present invention is concerned with a method for preparing an alumina hydrate composition containing trihydrate. This application is a continuation-in-part of our applications Serial Nos. 288,058, filed May 15, 1952, now abandoned, and 489,726, filed February 21, 1955, now U.S. Patent 2,838,444, which relate to an alumina hydrate composition which is particularly useful as a catalyst base precursor.

The present application is directed to a method for preparing such precursors wherein the alumina hydrate composition contains about 10 to 90 or 95% of crystalline trihydrate, preferably about 10 to 75%, with substantially the remainder of the composition being comprised of a material corresponding after drying to monohydrate, e.g. boehmite, or amorphous gelatinous hydrous alumina or mixtures of these forms. The various phases of the alumina hydrate composition are identified on the basis of X-ray diffraction analyses of samples dried at about 110 to 120° C. The trihydrate phase can contain one or more of the hydrate forms bayerite, gibbsite and randomite (bayerite-II). The alumina hydrate composition can be dried and calcined to provide a final catalyst, and at some period in the catalyst preparation catalytically active metal components, such as cobalt and molybdenum, can be added to the base. In our method we prefer to employ relatively pure reagents and corrosion resistant handling equipment to avoid contaminating materials.

The precursor alumina hydrate compositions prepared in our method shown by X-ray analysis of the dried structure a characteristic crystalline or quasi-crystalline appearance having a substantial amount of accessible pore volume in the form of large pores in contrast to the amorphous character and small pore structure of alumina monohydrate usually employed in catalyst preparations. It is preferred that the precursor alumina compositions should contain minute crystallites as evaluated by X-ray diffraction techniques on samples dried at approximately 110° C. Crystallites of about 1000 Angstrom units or less are indicated. Sometimes when observing the dried samples under an electron microscope there appears to be particles of sizes greater than 1000 Angstrom units. Since by X-ray diffraction these sizes are not indicated, these larger particles might be composed of separate crystallites. If the larger sizes constitute only a minor portion of the total sample, then it might be that their presence as single crystallites is not indicated by X-ray diffraction since this technique determines the average crystallite size considering all crystallites greater than 1000 Angstrom units as being of this size.

The large pores of the dried precursor base structure may be formed by the trihydrates because of the fact that the trihydrates in the uncalcined state are indicated by X-ray diffraction as crystalline materials of about 100 to about 1000 Angstrom units crystallite size. These large pores are not formed during calcination but actually exist in the dried, uncalcined alumina. The large pores do not exist in alumina bases derived from the boehmite or monohydrate form of precursor alumina, either before or after calcination. The boehmite type of precursor alumina is characterized by small crystallite size of the order of 40 Angstrom units before and after calcination and contains substantially no pores larger than 50 Angstrom units. It appears however that the presence of a proportion of the boehmite form or the amorphous hydrous alumina or their mixture in the precursor mixture is advantageous in insuring maximum retention during catalyst manufacture of the large-pore volume.

In the present invention we have found that the desired alumina hydrate composition can be provided by a series of steps including neutralizing an aluminum salt in an essentially aqueous medium. This reaction can be effected either by mixing a strong mineral acid salt of aluminum and ammonium hydroxide or a strong basic aluminum salt and a strong mineral acid such as hydrochloric, nitric or sulfuric acid. Suitable acid aluminum salts include aluminum chloride, aluminum nitrate and aluminum sulfate while sodium aluminate can be employed as the basic salt. This neutralizing can be conveniently accomplished at room temperature, and generally temperatures of the order of about 50 to 60° F. can be employed. Preferably the temperature is at least about 70° F. By neutralizing we do not mean that a pH of 7 is necessarily maintained, but the final pH of the reaction mixture will usually be from about 7 or 8 to 10.

The neutralizing reaction provides an alumina hydrate composition which as formed is a highly gelatinous precipitate composed of a mixture of amorphous gelatinous hydrous oxides that normally dry to boehmite or an amorphous-appearing alumina hydrate. We avoid this result by water washing the hydrate at a pH of less than about 10, for instance about 7 to 10, to remove electrolytes. During washing the temperature usually ranges from about 50 to 160° F. and the pH can be adjusted by ammonia addition. Washing can be continued until the electrolytes are materially removed so that subsequent conversion to trihydrate can be effected, and it is sometimes desirable to reduce the chloride or other anion content in the hydrate to a concentration of about 0.2% or less.

The washed material is converted to the desired mixture of alumina hydrates containing about 10 to 90 or 95% crystalline trihydrate by aging in an essentially aqueous medium at a pH of about 7 or 8 to 10 and at a temperature of about 70 to 170° F., preferably about 70 to 110° F. The use of higher temperatures tends to accelerate aging, and conversion can also be accelerated by seeding with small crystals of one or more of the trihydrates. The ultimate composition of the mixed hydrate catalyst precursor is controlled by the length of time allowed for aging. Unless the aging is stopped as by drying the alumina hydrate composition, conversion will continue until the material is substantially 100% trihydrate. In our method we age only until the desired trihydrate content is reached. The length of aging will be dependent upon several factors such as temperature and the amount of trihydrate desired in the precursor material. The transition to the desired phase system containing the crystalline trihydrate forms of alumina may be roughly controlled with experience by visual observation. The translucent hydrogel takes on a decidedly whiter and more opaque appearance as the crystallites form and cause light scattering. However, it may be desirable to control the transition by sampling, drying the sample to say about 110° C. and determining the distribution of hydrate phases by the technique of X-ray diffraction analysis. Pore volume determinations and surface area measurements as by the BET method are also useful. By this means, the preparation procedure with given materials, operating techniques and equipment may be standardized and then may be controlled as seems necessary with spot analytical checks.

The amount of trihydrate provided can vary depending upon the intended use of the catalyst of which the precursor base forms a part. For instance, in one application the composition can advantageously contain about 65 to 95% trihydrate, while for another intended use, e.g. for promotion of the desulfurization of petroleum hydrocarbons, the precursor material preferably is comprised of less than about 50° of trihydrate. The aged composition can be processed to a final catalyst according to the desires of the operator, for instance as disclosed in our mentioned copending applications to provide a catalyst base comprised essentially of gamma-alumina modifications.

The following specific examples will serve to illustrate the present invention but they are not to be considered limiting.

*Example I*

Twenty-five pounds of (Mallinckrodt's A.R. grade) aluminum chloride hexahydrate were dissolved in 50 liters of deionized water, using a wooden container to prevent contamination. Ammonium hydroxide solution was used as the precipitant and was prepared by mixing equal volumes of 0.90 sp. gr. ammonium hydroxide and deionized water. This was placed in a Pyrex container arranged for addition to the aluminum chloride solution by siphoning. While vigorously stirring the aluminum chloride solution, the solution of ammonium hydroxide was added at a rate to give a pH of 8.0 to 8.1 in 27 to 30 minutes' elapsed time. The flow of ammonium hydroxide solution was stopped at approximately pH 4.7 because of thickening. With continued stirring, fluidity was reestablished, after which the ammonium hydroxide addition was continued. Stirring was continued for thirty minutes, and then the precipitate was separated from the mother liquor by means of a plate and frame press. The filter cake from each of our batches was redispersed in 15-gallon portions of deionized water and the alumina hydrogen was washed by repeated filtering and reslurrying of the filter cake, with pH adjustment to 8 before filtering. The alumina hydrate was aged for fourteen days to convert to a mixture which by X-ray analysis was composed (dried) of 50% gibbsite (containing some randomite), 25% bayerite and 25% boehmite. The material washed 13 times was designated sample No. 400E9078.

A hydrate composition was precipitated essentially in accordance with the above method except pH 9 was used before the second filtering and water was passed through the filter cake while in the press to lower chloride content. A portion of this filter cake, taken two days after precipitation was oven dried to sample #400E9775. By X-ray analysis it contained 23% gibbsite plus randomite, 15% bayerite and remainder was boehmite and amorphous.

*Example II*

An alumina hydrate was prepared by adding $1NH_4OH:1H_2O$ to a solution of vigorously stirred $AlCl_3 \cdot 6H_2O$ (1 pound of $AlCl_3 \cdot 6H_2O$ per 2 liters of deionized water) until the pH equaled 8.0. The hydrate was filtered from the mother liquor and washed to 0.27% Cl (by filter press washing procedure). Reslurries were made using approximately 3 gallons of deionized $H_2O$ per pound of $Al_2O_3$ and the pH of the slurries was adjusted to 8.0 (first reslurry), 9.0, 8.5 and 8.5 (fourth reslurry). The washed hydrate was aged as a filter cake. The dried cake which was seventy-one old analyzed by X-ray diffraction 29% gibbsite, 42% bayerite, 22% randomite, 6 boehmite and traces of amorphous. The crystallite size of the trihydrate phases appeared to be small. A trihydrate-containing material can also be prepared essentially according to the procedure of this example while using sodium aluminate and hydrochloric acid as the reactants.

*Example III*

Alumina hydrate 400F9516 was a composite of two alumina hydrate preparations, each made by the following procedure: The alumina hydrate was precipitated by continuously adding 11.5 liters of $1NH_4OH:1H_2O$ (deionized) solution, at a rate of approximately 400 ml. per minute, to a vigorously stirred solution of $AlCl_3 \cdot 6H_2O$ (15 lbs. of $AlCl_3 \cdot 6H_2O$, Mallinckrodt analytical reagent grade dissolved in 30 liters of deionized water and filtered to remove any insolubles) until the pH equalled 8.0. The precipitation was completed in approximately 30 minutes. The slurry thickened up at pH 4.5 to 5.0 and ammonium hydroxide addition was discontinued for approximately 30 seconds until stirring was efficient. After the precipitation was complete, the slurry was stirred for 30 minutes and the hydrate was filtered from the mother liquor using a plate and frame filter press. The filter cake was washed in the press about 16 hours with flowing deionized water at a temperature of about 75 to 80° F. The alumina hydrate was removed from the filter press and reslurried in 15 gallons of deionized water. The pH was then adjusted to 9.0 by adding a solution of $1NH_4OH:1$ water (deionized). The hydrate was filtered in the plate and frame press and washed approximately 16 hours with deionized water at 75 to 80° F. The washing just described was repeated and the final washed cake contained less than about .1% Cl. Two batches of washed hydrate were composited where one batch had aged 12 days (from precipitation) and the other 7 days. The composite was mixed thoroughly and assigned No. 400F9516. The dried composite analyzed by X-ray diffraction 9% amorphous, 10% boehmite, 28% bayerite and 53% randomite plus gibbsite. The hydrate was of relatively small crystallite size.

We claim:

1. In a method of preparing alumina hydrate catalyst base precursor compositions consisting essentially of a member selected from the group consisting of amorphous hydrous alumina, alumina-monohydrate and their mixture and about 10 to 95 weight percent of alumina-trihydrate, the sequence of steps comprising (1) neutralizing to a pH between about 7 and 10 in an aqueous medium a salt of aluminum selected from the group consisting of the strong mineral acid aluminum salts and the strong basic aluminum salts said neutralization of the acid aluminum salt being effected with ammonium hydroxide and said neutralization of the basic aluminum salt being effected with a strong mineral acid to precipitate an alumina hydrate, (2) washing the hydrate with water at a pH less than about 10 to materially remove electrolyte formed during precipitation and present in the hydrate before substantial production of alumina trihydrate, (3) aging the washed hydrate in an essentially aqueous medium at a pH of about 8 to 10 and a temperature of about 70 to 170° F. until the hydrate composition contains about 10 to 95 percent of trihydrate, and (4) stopping the aging of the hydrate by drying when the said hydrate contains about 10 to 95 percent trihydrate.

2. The method of claim 1 in which the alumina precipitate is formed by neutralizing aluminum chloride with ammonium hydroxide.

3. In a method of preparing alumina hydrate catalyst base precursor compositions consisting essentially of a member selected from the group consisting of amorphous hydrous alumina, alumina-monohydrate and their mixture and about 65 to 95 weight percent of alumina-trihydrate, the steps comprising neutralizing to a pH between about 7 and 10 in an aqueous medium a salt of aluminum selected from the group consisting of the strong mineral acid aluminum salts and the strong basic aluminum salts said neutralization of the acid aluminum salt being effected with ammonium hydroxide and said neutralization of the basic aluminum salt being effected with a strong mineral acid to precipitate an alumina hydrate, washing the hydrate with ammoniacal water at a pH of about 7 to 10 to materially remove electrolyte formed during precipitation and present in the hydrate before substantial production of alumina trihydrate, aging the washed hydrate in an essentially aqueous medium at a pH of about 8 to 10 and at a temperature of about 70 to 170° F. until the hydrate composition contains about 65 to 95 percent of trihydrate, and stopping the aging of the hydrate by drying when the said hydrate contains about 65 to 95 percent trihydrate.

4. The method of claim 3 in which the alumina precipitate is formed by neutralizing aluminum chloride with ammonium hydroxide and the washing is conducted to decrease the anion content of the hydrate to not more than about 0.2 percent.

References Cited in the file of this patent
UNITED STATES PATENTS

| | | |
|---|---|---|
| 2,406,420 | Weiser et al. | Aug. 27, 1946 |
| 2,478,675 | Tamele et al. | Aug. 9, 1949 |
| 2,549,549 | Wall | Apr. 17, 1951 |
| 2,590,833 | Bechtold et al. | Apr. 1, 1952 |
| 2,777,805 | Le Francois et al. | Jan. 15, 1957 |